United States Patent
Shan et al.

(10) Patent No.: US 7,783,509 B1
(45) Date of Patent: Aug. 24, 2010

(54) DETERMINING THAT A CHANGE HAS OCCURED IN RESPONSE TO DETECTING A BURST OF ACTIVITY

(75) Inventors: Jerry Z. Shan, Palo Alto, CA (US); Mehmet Sayal, Mountain View, CA (US); Ming-Chien Shan, Saratoga, CA (US); Fereydoon Safai, Los Altos Hills, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1202 days.

(21) Appl. No.: 11/373,592

(22) Filed: Mar. 10, 2006

(51) Int. Cl.
*G06F 17/50* (2006.01)
(52) U.S. Cl. ........................ 705/7
(58) Field of Classification Search ............ 705/7
See application file for complete search history.

(56) References Cited

U.S. PATENT DOCUMENTS

| | | | | |
|---|---|---|---|---|
| 5,996,090 | A * | 11/1999 | Hellerstein | 714/25 |
| 7,297,113 | B1 * | 11/2007 | Russell et al. | 600/302 |
| 2003/0233273 | A1 | 12/2003 | Jin et al. | |
| 2004/0015458 | A1 | 1/2004 | Takeuchi et al. | |
| 2005/0249214 | A1 * | 11/2005 | Peng | 370/392 |

OTHER PUBLICATIONS

Wang et al; Change-pont monitoring for detection of DoS attacks; Dec. 1, 2004; Institute of Electrical and Electronics Engineers Inc.; dialog abstract.*
Hajji, H; Statistical analysis of network traffic for adaptive faults detection; Sep. 2005; IEEE Transactions on Neural Networks, vol. 16, No. 5, pp. 053-63; dialog abstract.*
Shan et al., U.S. Appl. No. 10/322,201, entitled "Method and System for Predicting Revenue Based on Historical Pattern Identification and Modeling," filed Dec. 17, 2002, pp. 1-22, Figs. 1-8.
Shan et al., U.S. Appl. No. 10/355,353, entitled "Method and System for Construction Prediction Interval Based on Historical Forecast Errors," filed Jan. 31, 2003, pp. 1-21, Figs. 1-6.
Shan et al., U.S. Appl. No. 10/959,861, entitled "Methods and Systems for Cumulative Attribute Forecasting Using a PDF of a Current-To-Future Value Ratio," filed Oct. 6, 2004, pp. 1-18, Figs. 1-6.
Bea WebLogic Server Capacity Planning Guide, Rel. 8.1, 54 pages, Jun. 16, 2003.
J.Z. Shan, "Sequential Detection of Parameter Changes in Linear Dynamic Systems and Regression Models," pp. 1-75 (1995).
J. Shan, U.S. Appl. No. 11/119,037, entitled "Detecting Change in Data," filed Apr. 29, 2005, pp. 1-26, Figs. 1-6.

(Continued)

*Primary Examiner*—Thomas Dixon

(57) ABSTRACT

A time series of data values representing occurrences of events at plural time points is received. Durations between successive events are computed, and a burst of activity based on the computed durations is detected. It is determined that a change has occurred in response to detecting the burst of activity.

17 Claims, 5 Drawing Sheets

OTHER PUBLICATIONS

J. Shan, U.S. Appl. No. 11/117,989, entitled "Performing Quality Determination of Data," filed Apr. 29, 2005, pp. 1-32, Figs. 1-6.
http://www.stat.yale.edu/Courses/1997-98/101linreg.htm, "Linear Regression," pp. 1-3 (at least as early as Apr. 6, 2005).

J.Z. Shan, U.S. Appl. No. 11/118,832, entitled "Determining a Time Point Corresponding to a Change in Values Based on Fitting with Respect to Plural Aggregate Value Sets," filed Apr. 29, 2005, pp. 1-26, Fig. 1-8.

* cited by examiner

DETERMINING THAT A CHANGE HAS OCCURED IN RESPONSE TO DETECTING A BURST OF ACTIVITY

BACKGROUND

In business, educational, governmental or other contexts, various types of activities can be monitored. Examples of activities include calls at a call center of a business, visits by users at a website (e.g., online shopping website), visits by customers at a retail store, and so forth.

It is often useful to detect, based on the monitored activities, whether a change has occurred in a system or within an organization. Such change can occur as a result of changes in business environment (e.g., expansion into new markets, loss of market share, unexpected changes in cost structure, etc.), or as a result of errors or other un-planned anomalies (e.g., infrastructure error, such as hardware or software error, operator input error, etc.). However, many conventional algorithms for detecting changes in a system or within an organization based on monitored activities are often inefficient or inaccurate.

BRIEF DESCRIPTION OF THE DRAWINGS

Some embodiments of the invention are described with reference to the following figures.

DETAILED DESCRIPTION

Figure 1:
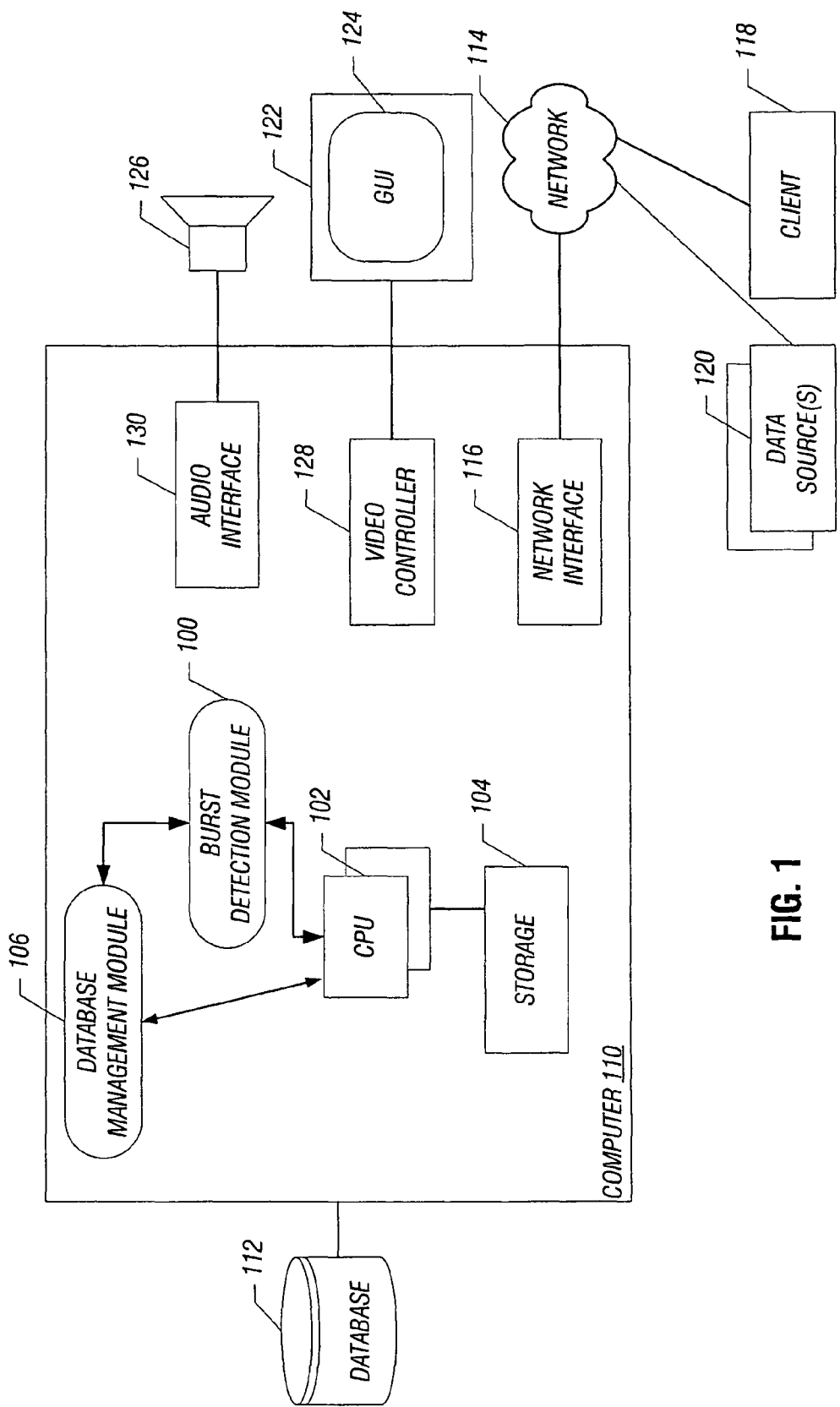
FIG. 1 is block diagram of a system in which a burst detection module according to an embodiment is executable.

FIG. 1 shows an example system that includes a burst detection module 100 that is executable on one or plural central processing units (CPUs) 102 in a computer 110 (or in multiple computers). The computer 110 can be a desktop computer, notebook computer, server computer, personal digital assistant (PDA), or other type of computing device. In some embodiments, the burst detection module 100 is implemented in software. In other embodiments, the burst detection module can be implemented in hardware, or in a combination of hardware and firmware.

The burst detection module 100 is able to process data values that correspond to plural time points for the purpose of detecting either an increased or decreased burst of activity based on the data values. The data values corresponding to plural time points represent events (e.g., calls to a call center; visits to a website; visits to a retail store; utilization of hardware or software resources such as CPU, input/output, or storage resources; response time performance; data network traffic; and so forth) occurring at the time points. A "burst" refers to either increased activity or decreased activity. Thus, an increased burst refers to an increased frequency of occurrence of events, whereas a decreased burst refers to decreased frequency of events. The increased or decreased burst of activity is an indication that some underlying change has occurred within a system, an infrastructure, or an organization. The frequency (or intensity) of events in the time domain reflects the state of the associated system, infrastructure, or organization. A change in the frequency of the events can be an indication of system, infrastructure, or organization change, such as due to changes in business environment (e.g., expansion into new markets, loss of market share, unexpected changes in cost structure, etc.), or as a result of errors or other un-planned anomalies (e.g., infrastructure error, such as hardware or software error, operator input error, etc.).

Bursts that occur over a relatively short time interval, such as very momentary network traffic bursts or momentary service interruptions, usually do not cause long-term problems and may be ignored in most cases. However, bursts that are not momentary may cause damage and should be detected as soon as possible. For example, when a customer online shopping web server goes down, an action should be taken as soon as possible to prevent business loss and to maintain customer satisfaction. The burst detection module 100 according to some embodiments is able to detect for increased or decreased bursts of activity that are indications of a change that could be indicative of a problem. The burst detection module 100 uses algorithms according to some embodiments that are able to reliably detect increased or decreased bursts, especially bursts that are not momentary. The burst detection module 100 thus provides an automated way of performing change detection based on detected non-momentary increased or decreased bursts of activity.

As further depicted in FIG. 1, the one or plural CPUs 102 are coupled to a storage 104 (which can include volatile memory, non-volatile memory, and/or a mass storage device). The computer 110 also includes a database management module 106 that is executable on the one or plural CPUs 102. Alternatively, the database management module 106 can be executable on a computer that is separate from the computer 110 on which the burst detection module 100 is executed. The database management module 106 manages the access (read or write) of data stored in a database 112. The database 112 can be implemented in storage device(s) connected to the computer 110, or alternatively, the database 112 can be implemented in a server or other computer coupled over a data network, such as data network 114.

The computer 110 communicates over the data network 114 through a network interface 116. Example devices or systems that are coupled to the data network 114 include a client 118 and one or plural data sources 120. The data sources 120 (which can be associated with different organizations, departments within an organization, or other types of entities) are able to collect data that is then transmitted over the data network 114 and through the computer 110 for storing in the database 112.

The burst detection module 100 can check for increased or decreased bursts by monitoring data stored in the database 112. Examples of data that can be stored in the database 112 include retail or wholesale sales data, invoice data, production volume data, inventory data, revenue data, financial data, cost data, quality control data, network traffic data, resource usage data, and other forms of data. In response to determining that a change has occurred based on detecting an increased or decreased burst in the data, the burst detection module 100 is able to provide an alert (e.g., an alarm) to a user of an estimated time point (which is a form of "change point") at which the change in data occurred. Note that the burst detection module 100 is also able to check for changes in data of other databases aside from database 112. In yet another arrangement, the burst detection module 100 can monitor data values that are continually being received at the computer 110 over the network 114 for the purpose of detecting increased or decreased bursts of activity.

Figure 2:
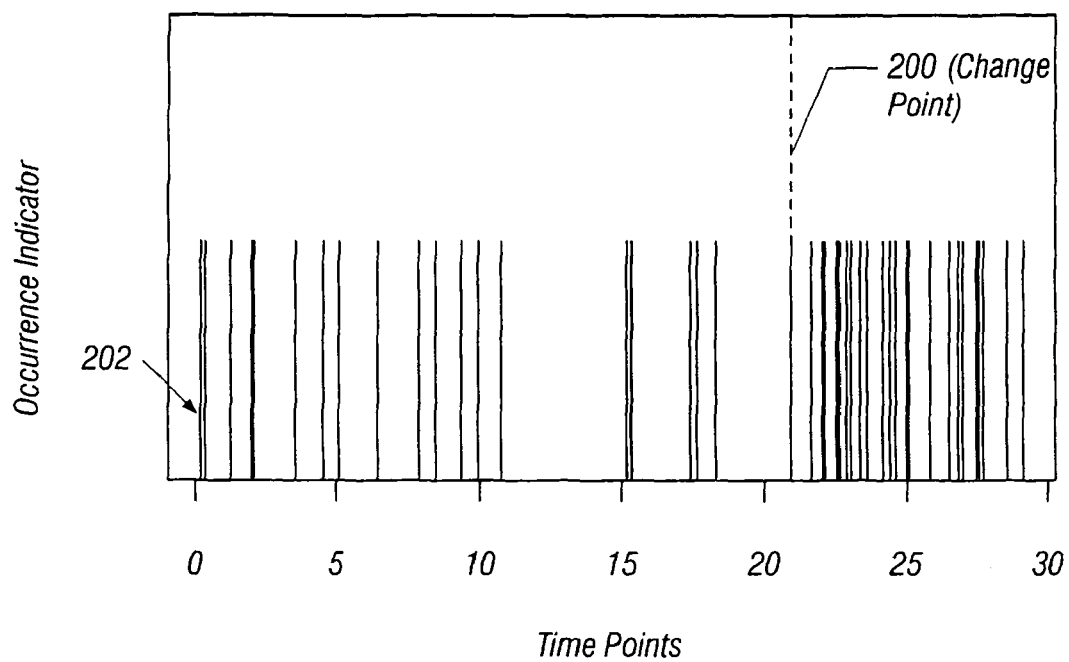
FIG. 2 is a graph showing a time series of events that is associated with a change point detectable by the burst detection module, according to an embodiment.

FIG. 2 is a graph illustrating occurrences of events at various discrete time points. The horizontal axis of the graph in FIG. 2 represents time points, whereas the vertical axis of the graph represents occurrence of an event. A time series of bars 202 is depicted in FIG. 2. Each bar 202 represents occurrence of an event at a particular time point, whereas lack of a bar 202 represents that an event did not occur at the time point. The occurrence of an event can be, for example, customer arrival at an online shopping site, customer arrival at a retail store, receipt of a call at a call center, and so forth. Each bar 202 has the same value (and thus all bars 202 depicted in FIG. 2 have the same height in the graph). In one implementation, the data value associated with occurrence of an event (a bar 202 is present) is represented by a value representing logical "1", whereas the data value associated with lack of a bar 202 is logical "0" or a null value.

In the example depicted in FIG. 2, the frequency of event occurrences prior to a time point represented by dashed line 200 is generally lower than the frequency of event occurrences at time points after the time point corresponding to dashed line 200. The increased frequency of occurrences after the time point corresponding to dashed line 200 represents an increased burst of activity that is detectable by the burst detection module 100. In accordance with some embodiments, the burst detection module 100 is able to identify the time point corresponding to dashed line 200 (or some other time point close to the time point corresponding to dashed line 200) as a change point (that corresponds to a time point at which a change occurred).

Note that the increased burst of activity represented by events occurring after the time point corresponding to dashed line 200 is contrasted to the increased frequency of occurrences near time point 0 and time point 15 in FIG. 2. The short duration between event occurrences near time point 0 and time point 15 constitute momentary increased activity that does not necessarily indicate that a change in the system, infrastructure, or organization has occurred. However, after the time point corresponding to dashed line 200, a more intense and non-momentary burst of activity represented by the higher frequency of occurrences of events (represented by bars 202 after the time point corresponding to dashed line 200) is indicative that a change has occurred.

Figure 3:
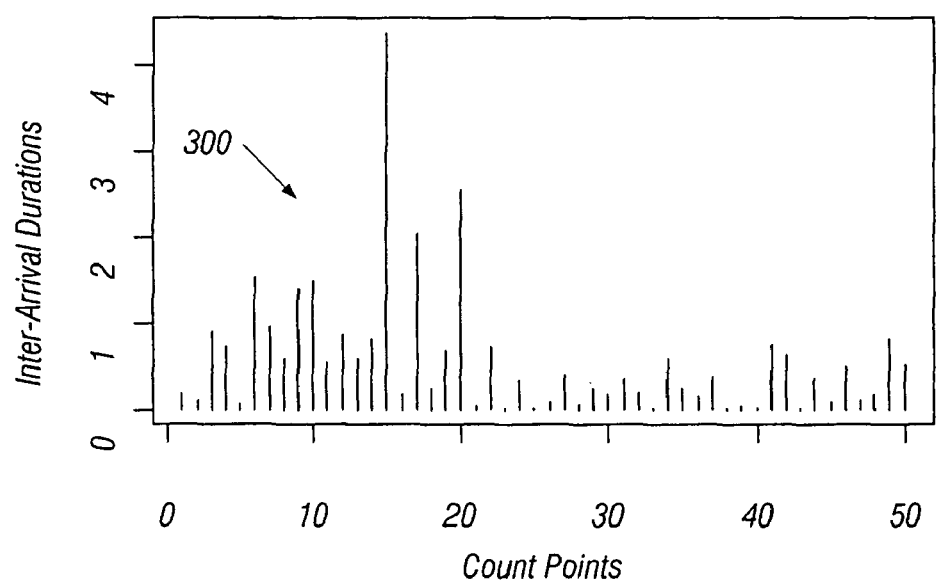
FIG. 3 is a graph that correlates count points to inter-arrival durations that are processed by the burst detection module for detecting a change point, according to an embodiment.

FIG. 3 illustrates the information depicted by FIG. 2, except that in FIG. 3, the horizontal axis corresponds to count points, while the vertical axis corresponds to inter-arrival durations. The count point axis represents the counts of occurred events. Each count point represents a count number at which an event occurred. Thus, count point 1 represents the first occurred event, count point 2 represents the second occurred event, and so forth. The inter-arrival-duration axis represents the duration between two successive count points (represented by bars 300). Thus, for example, at count point 2, the inter-arrival duration value (indicated by a bar 300 at count point 2) represents the time duration between the first occurred event (count point 1) and the second occurred event (count point 2).

Figure 4:
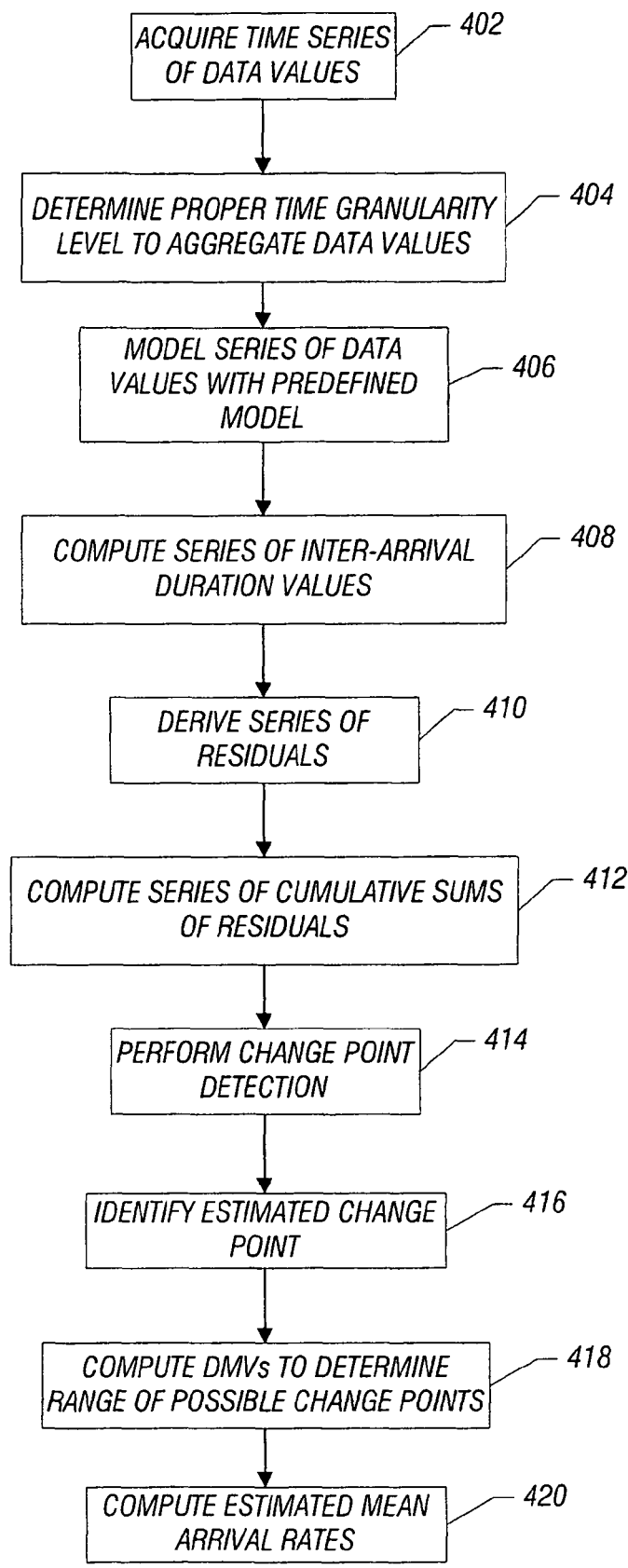
FIG. 4 is a flow diagram of a process performed by the burst detection module of FIG. 1, in accordance with an embodiment.

FIG. 4 shows a flow diagram of the process performed by the burst detection module 100 according to an embodiment. Note that according to some implementations, the process is performed offline (in other words, data values are collected and the burst detection technique according to an embodiment is applied some time after the data values have been collected). Alternatively, the burst detection technique can be performed online (in other words, the burst detection is performed as data values are received).

The burst detection module first acquires (at 402) a time series of data values that has been recorded at corresponding time points. The data values represent occurrence of a certain event of interest (e.g., arrival of customers at a website or a retail store, receipt of calls at a call center, etc.). Note that the data values received can represent either that an event occurred or that an event did not occur. For example, a data value of "1" can represent that an event occurred, while a data value of "0" (or null value) can represent that no event occurred at that particular time point. If the event being monitored occurs continuously, then discretizing is performed first to break the continuous time into discrete time points, such that events occurring continuously over time are converted to events occurring at discrete time points.

In acquiring the time series of data values, the lowest time granularity level possible is used. For example, if an organization is interested in the daily volume of customers at a shopping site and such organization has access to both daily volume record and hourly volume record, then the latter is used to provide greater flexibility in how the time series of data values is processed. Acquiring data values at a finer time granularity level allows for observation of more subtle changes that may not be possible to detect at coarser time granularity levels. Note that the data values acquired at a finer time granularity level can be easily aggregated to produce a time series of data values at a coarser time granularity level. For example, it would be easy to convert the time series of data values at hourly time points into a time series of data values at daily time points.

Next, the burst detection module 100 determines (at 404) the proper granularity level to aggregate the time series of data values. For example, if the acquired time series of data values is at the hourly level, then a determination is made regarding whether subsequent processing is to be performed at the hourly level or at a coarser time granularity level (such as daily, weekly, monthly, etc.). The proper time granularity level is determined based on various criteria, including business considerations, desired results, and so forth. For example, detection of change points at the hourly time granularity level may not be useful for an organization that may not be able to respond that quickly (on an hourly basis) to detected changes. For such an organization, change point detection at a daily level or a weekly level may be more useful.

Note that the acquisition of data values at a particular time granularity level (402) and processing of data values at a particular time granularity level (404) can be based on interaction with an entity involved in collecting the data values and based on feedback from the burst detection module 100 whether processing at the particular time granularity level provides the desired information. Note that collection of data at finer time granularity levels is often more expensive; as a result, a tradeoff is performed between cost and quality of burst detection.

Next, the acquired time series of data values is automatically modeled (at 406), by the burst detection module 100, with a predefined model, such as a Poisson process. In other implementations, other models such as multinomial models can be used to characterize the time series of data values. With the Poisson process, a mean arrival rate (which represents the frequency of event occurrence) can be defined. A change in the arrival intensity is modeled by shift in the mean arrival rate. Specifically, prior to a change point, the arrival process of occurrences of the event of interest is modeled with a Poisson process with mean parameter $\lambda_0$. After the change point, the arrival process of occurrences of the event of interest is modeled with a Poisson process with mean parameter $\lambda_1$. Note that $\lambda_0$ and $\lambda_1$ represent mean arrival rates before and after, respectively, a change point. The Poisson process with mean parameter $\lambda_0$ and the Poisson process with mean parameter $\lambda_1$ are independent Poisson processes.

The time points corresponding to the acquired time series of data values are represented by the following series of time points: $T_0, T_1, T_2 \ldots T_N$ (for example, the time points $T_0, T_1, T_2 \ldots T_N$ can represent the time points on the horizontal axis of FIG. 2). Each recorded observation on time, $T_n$, represents a time point (T) at a count number n (for example, n corresponds to a count point represented by the horizontal axis of the chart in FIG. 3).

Figure 5:
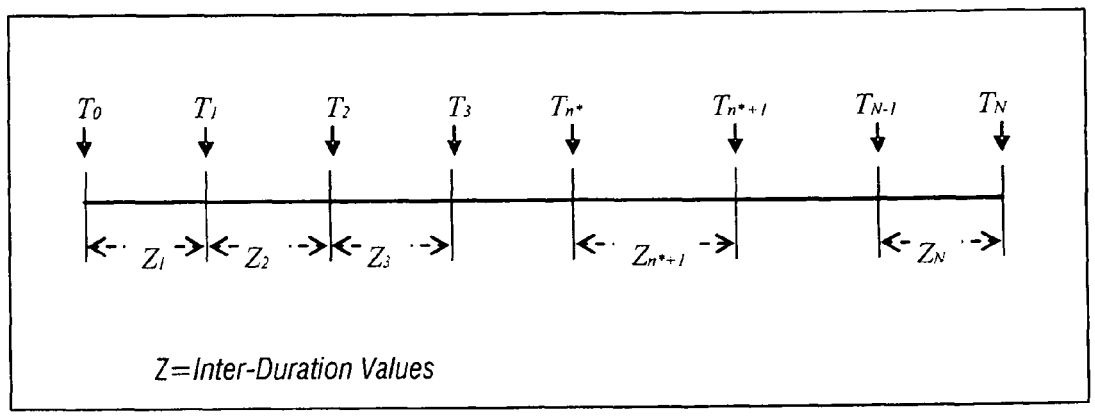
FIG. 5 is a graph illustrating time points and durations between time points, where such durations are processed by the burst detection module for detecting a change point, according to an embodiment.

The time series can be represented as in FIG. 5, where $T_{n*+1}$ represents a possible change point, as it represents the time corresponding to count number n*+1, which is the first count number after the process has undergone a change. Note that the change point $T_{n*+1}$ is unknown from the acquired time series of data values—this change point is determined by statistical inference based on algorithms described further below. In one example implementation, the time origin (which is the first time point $T_0$ for the time series of data values) is assumed to be 0, and the inter-arrival duration is computed (at 408) as follows: $Z_n = T_n - T_{n-1}$, n=1, 2, ..., N. With this model, the inter-arrival durations before the process change are $Z_n$ for n=1, 2, ..., n*, which are all independently and identically distributed with an exponential distribution $E(\lambda_0)$, with a mean parameter $\lambda_0$. The inter-arrival durations after the process change are $Z_n$ for n≧n*+1, and are all independently and identically distributed with an exponential distribution $E(\lambda_1)$, with a mean parameter $\lambda_1$. In addition, the inter-arrival durations before the process change and after the process change are also independent. The parameters $\lambda_0, \lambda_1$, the time of the change point $T_{n*+1}$, (or equivalently, the count of the change point n*+1) are all unknown at this point. The change point identified by the burst detection module 100 can either be expressed as a time point $T_{n*+1}$ or a count point n*+1, as described further below.

Next, the burst detection module 100 derives (at 410) a series of residuals, $\{r_n: n=1, 2, \ldots, N\}$, where $r_n = Z_n - \bar{Z}$, and $\bar{Z}$ is the overall observation average of all the $Z_n$ values. Thus, each residual value $r_n$ is basically the inter-arrival duration between two successive count points less the average of all the inter-arrival durations for the acquired time series of data values.

Next, the burst detection module 100 computes (at 412) the cumulative sums of the residual series, according to the following: $R = \sum_{i=1}^{n} r_i \sum_{i=1}^{n} (Z_i - \bar{Z})$. The burst detection module 100 then performs (at 414) change point detection on the inter-arrival duration series $\{Z_n: n=1, 2, \ldots, N\}$ to detect the change directly. In one approach, detection of a change point in the inter-arrival duration series $\{Z_n: n=1, 2, \ldots, N\}$ is accomplished by using a regression cumulative sums (CUSUM) detection technique. The regression CUSUM detection technique is applied on the cumulative residuals series $\{R_n: n=1, 2, \ldots, N\}$, with the regression performed on the count variable n. The regression could be performed on the time variable $T_n$ in theory; however, the spares distribution of values of $T_n$ could result in unsatisfactory fit for the regression. Therefore, according to some embodiments, the regression CUSUM detection technique is directly applied on a series based on count points.

Effectively, the regression CUSUM detection technique enables the detection of increased or decreased burst of activity that indicates a change in an underlying system, infrastructure, or organization. The regression CUSUM detection technique also produces an estimated change point (or a range of estimated change points) that indicates a point at which the change has most likely occurred. Also, the regression CUSUM detection technique is able to distinguish between momentary and non-momentary increased or decreased bursts of activity.

According to some embodiments, the regression CUSUM detection algorithm involves linear regression fitting onto curved segments representing aggregate values (in this case, the cumulative sums $R_n$). Note that in other implementations, other forms of aggregates such as window-limited cumulative sums (the cumulative sums of a certain number of the most recent values) aside from the usual cumulative sums (the cumulative sums from the first value through the current value) can be computed, on which the regression detection technique can be applied.

Figure 6:
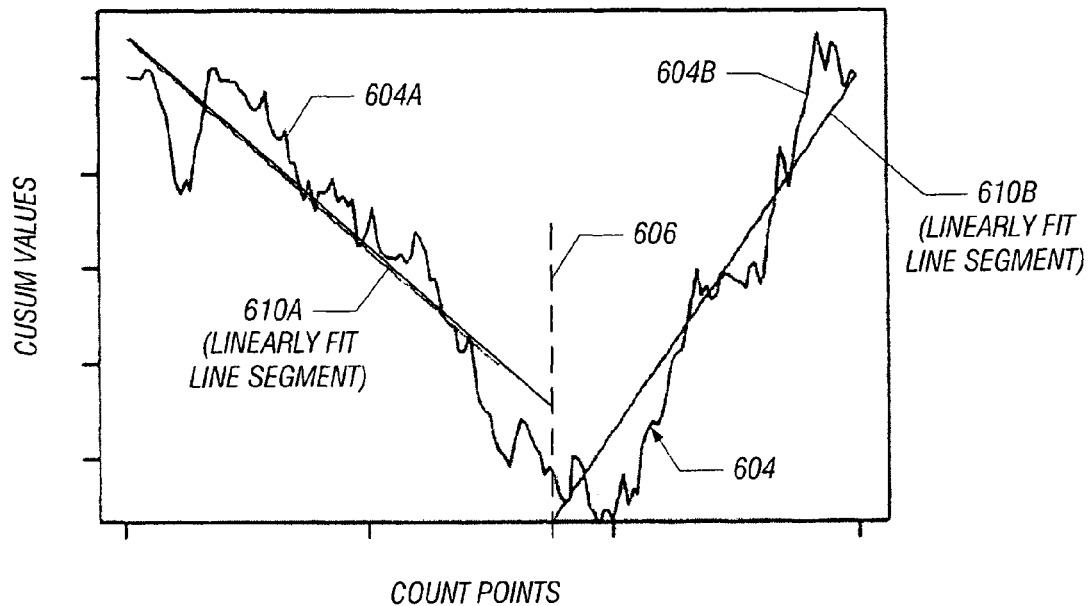
FIG. 6 is a graph illustrating linear fitting onto curve segments representing cumulative sum values that are performed by the burst detection module, in accordance with an embodiment.

As depicted in FIG. 6, in some embodiments, at least two curve segments 604A and 604B that are part of a curve 604 representing the aggregate values (cumulative sums $R_n$) are defined. Linear fitting is performed to fit line segments 610A and 610B onto the respective curve segments 604A and 604B representing the aggregate values. In one embodiment, linear fitting is performed by building linear regression models with respect to the curve segments. In other embodiments, other forms of fitting can be performed, including non-linear fitting.

Each curve segment 604A, 604B represents a respective set of aggregate values. For example, if a curve representing a series of aggregate values is divided into two curve segments, then the two curve segments represent two respective sets of the aggregate values (also referred to as "aggregate value sets"). If the time series of aggregate values is divided into two aggregate value sets, these two aggregate value sets are referred to collectively as a pair of aggregate value sets. Change point detection is based on the fittings (e.g., linear fittings) performed by the burst detection module 100 with respect to the aggregate value sets. In FIG. 6, the two aggregate value sets are divided by dashed line 606 (with a first aggregate value set containing aggregate values represented by curve segment 604A, and a second aggregate value set containing aggregate values represented by curve segment 604B).

Figure 7:
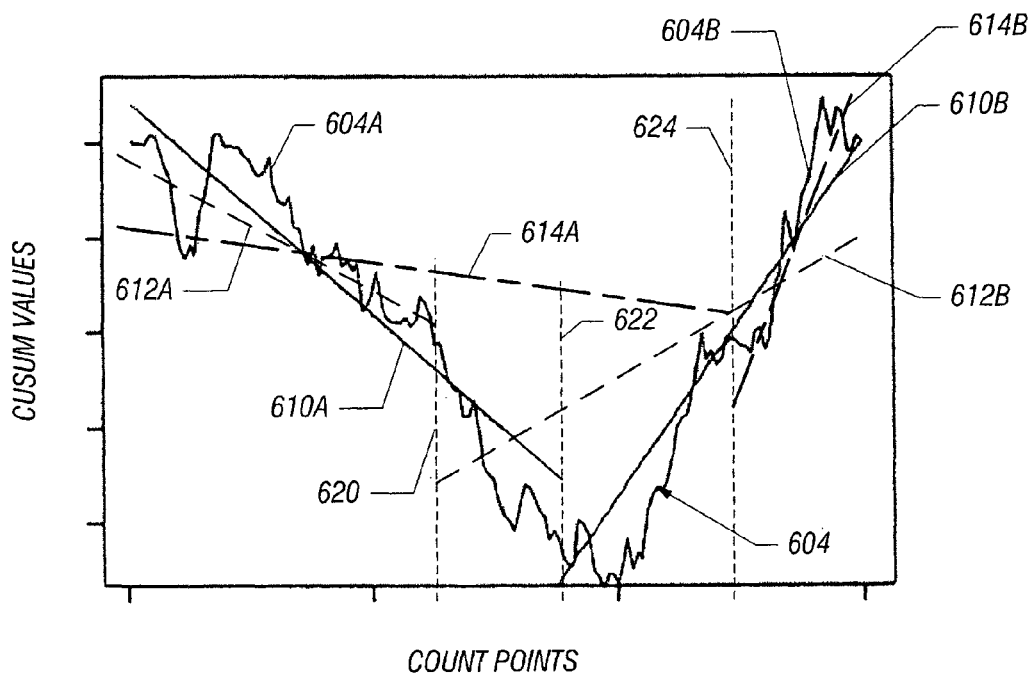
FIG. 7 is a graph showing multiple linear fittings onto curve segments representing the cumulative sum values that are performed by the burst detection module, in accordance with an embodiment.

In the analysis according to an embodiment performed by the burst detection module 100 to find a change point, multiple pairs of aggregate value sets are defined. As depicted in FIG. 7, three pairs of aggregate value sets are defined. A first pair includes a first set of aggregate values (represented by curve segment 604A) on one side of dashed line 620, and a second set of aggregate values (represented by curve segment 604B) on the other side of dashed line 620. A second pair includes a first set of aggregate values on one side of dashed line 622, and a second set of aggregate values on the other side of dashed line 622. A third pair includes a first set of aggregate values on one side of dashed line 624, and a second set of aggregate values on the other side of dashed line 624.

The numbers of members of the aggregate value sets are varied in the multiple pairs of aggregate value sets such that the aggregate value sets in one pair have differing numbers of members than aggregate value sets in another pair. For example, for a series of N aggregate values that is divided into two aggregate value sets, a first pair of aggregate value sets can have a first aggregate value set with m aggregate values, and a second aggregate value set with N–m aggregate values. In a second pair of aggregate value sets, the number of aggregate values in a first aggregate value set is k (k≠m), and the number of aggregate values in a second aggregate value set is N–k.

As further depicted in FIG. 7, a linear fitting is performed with respect to each of the multiple pairs of aggregate value sets (lines 612A, 612B are fitted onto curve segments corresponding to the first pair; lines 610A, 610B are fitted onto curve segments corresponding to the second pair; and lines 614A, 614B are fitted onto curve segments corresponding to the third pair). Additional pairs of aggregate value sets are further defined, with further fittings performed on these additional pairs of aggregate value sets.

Comparisons of the fittings performed on the multiple pairs of aggregate value sets are performed to identify an optimal fit, which identifies the pair of aggregate value sets (from among the multiple pairs of aggregate value sets) associated with the optimal fit. This identified pair of aggregate value sets associated with the optimal fit provides the indication of the change point (the count point at which a change in observed data values occurs).

In some embodiments, the comparisons to identify an optimal fit are based on a goodness-of-fit analysis performed for each of the linear regression models built for respective pairs of aggregate value sets. Measures of the goodness-of-fit analyses are then computed and compared to determine the optimal fit from among the linear fits performed on the multiple pairs of aggregate value sets. A goodness-of-fit measure is computed for how well each line segment (for the linear fitting) fits onto the corresponding curve segment representing an aggregate value set. The goodness-of-fit measure can be one of any number of measures, including R-squares, adjusted R-squares, AIC (Akaike's Information Criterion), BIC (Bayesian Information Criterion), and other goodness-of-fit measures.

Further details regarding some embodiments of regression CUSUM detection algorithms are provided in U.S. Ser. No. 11/118,832, entitled "Determining a Time Point Corresponding to a Change in Data Values Based on Fitting with Respect to Plural Aggregate Value Sets," filed Apr. 29, 2005.

In other embodiments, other forms of detection algorithms can be applied to the cumulative sums of residuals series $R_n$, such as a CUSUM detection algorithm, a GLR (generalized likelihood ratio) algorithm, and so forth. Any of the various change point detection algorithms enables the accurate detection of non-momentary bursts that are indicative of an actual change (as opposed to momentary bursts that are not indicative of actual change).

As further depicted in FIG. 4, the estimated change point identified (at 416) by the burst detection module 100 is denoted as count point $\hat{n}^*$. Note that the count point $\hat{n}^*$ is an estimated count number at which a change has occurred. Usually, change point detection algorithms may not be able to determine the exact point at which a change occurred, so that the change point identified by the change-point detection algorithm may be before or after the actual change point. The time of the detected change point is then represented as $T_{n^*+1}$. In a business environment, for example, the identified change point can be used to indicate that a change in the business environment has occurred.

Optionally, as part of the regression CUSUM detection algorithm, the burst detection module 100 computes (at 418) detection measurability values (DMVs) that represent goodness-of-fit measures. From the DMV values, a range of change points (identified as 800 in FIG. 8), can be identified as possible change points.

Figure 8:
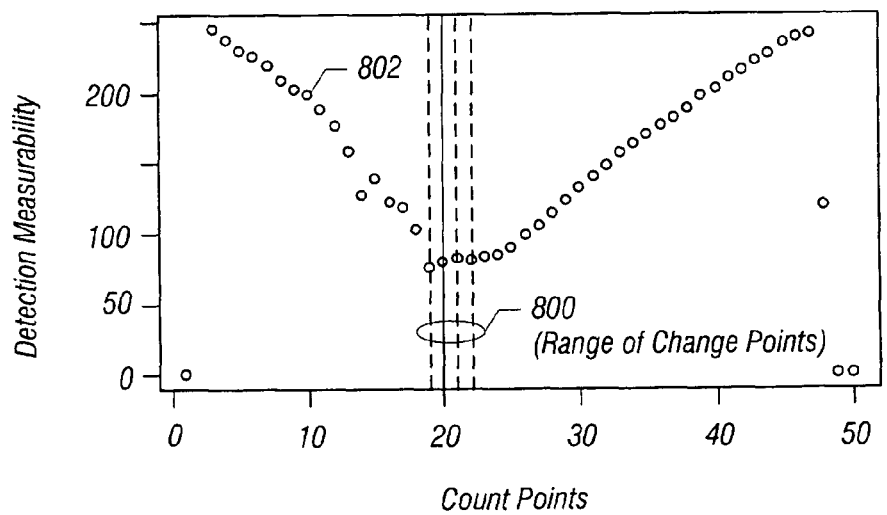
FIG. 8 is a graph of detection measurability values over time, as computed by the burst detection module, according to an embodiment.

A confidence level, such as 1–α=90%, is set to identify the most likely values for the change point in the possible change point set. Then the quantile value of the possible change point set is computed at level α. Effectively, in the example where the confidence level is 1–α=90%, the quantile value of the possible change point set at level α, in this example 10%, is computed by finding the values of the DMV that are within 10% of the minimum DMV (in other words, these values of the DMV satisfy the set confidence level). An example is illustrated in FIG. 8, where the DMVs (represented by curve 802 that is made up of the dots) includes AIC values, and the count points indicated by dashed lines 800 correspond to the quantile values of DMV.

Next, as further shown in FIG. 4, the estimated mean arrival rates before and after the change points are calculated (at 420), where the estimated arrival rate $\hat{\lambda}_0$ estimates the rate of event arrivals prior to the estimated change point $\hat{n}^*$, and the estimated arrival rate $\hat{\lambda}_1$ estimates the rate of event arrivals after the estimated change point $\hat{n}^*$. The estimated arrival rates are calculated as follows:

$$\hat{\lambda}_0 = \frac{\hat{n}^*}{\sum_{i=1}^{\hat{n}^*} Z_i},$$

and $$\hat{\lambda}_1 = \frac{N - \hat{n}^*}{\sum_{i=\hat{n}^*+1}^{N} Z_i}.$$

Using the techniques discussed above, according to some embodiments, a reliable and accurate mechanism is provided to determine a change that occurs as a result of increased or decreased bursts of activity. Flexibility is provided by selecting a time granularity level at which the change detection is to be performed.

Instructions or code of software described above (including the burst detection module 100 in FIG. 1) are loaded for execution on a processor (e.g., CPUs 102). The processor includes microprocessors, microcontrollers, processor modules or subsystems (including one or more microprocessors or microcontrollers), or other control or computing devices.

Data and instructions (of the software) are stored in respective storage devices (e.g., storage 104 in FIG. 1), which are implemented as one or more machine-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method comprising:
receiving a time series of data values representing occurrences of events at plural time points;
computing, by a computer, durations between successive events, wherein computing the durations comprises computing a series of duration values at respective count points, the count points representing counts of the events;
detecting, by the computer, a burst of activity based on the computed durations;
determining, by the computer, that a change has occurred in response to detecting the burst of activity;
computing, by the computer, an average value of the duration values; and
computing, by the computer, a series of residual values based on a difference between the duration values and the average value.

2. The method of claim 1, further comprising computing a series of aggregate values based on the residual values.

3. The method of claim 2, further comprising applying a regression detection technique on the series of aggregate values to identify an estimated change point corresponding to the change.

4. The method of claim 3, wherein detecting the burst of activity comprises detecting a non-momentary burst of activity.

5. A method comprising:
receiving a time series of data values representing occurrences of events at plural time points;
computing, by a computer, durations between successive events;
detecting, by the computer, a burst of activity based on the computed durations;
determining, by the computer, that a change has occurred in response to detecting the burst of activity; and
automatically modeling, with software executed in the computer, the time series of data values with a model that has a first arrival process of events prior to a change point with a first mean arrival rate, and that has a second arrival process of events after the change point with a second mean arrival rate.

6. The method of claim 5, wherein detecting the burst of activity and determining that the change has occurred are based on an algorithm selected from the group consisting of a change point detection algorithm, a regression detection algorithm, and a regression cumulative sums detection algorithm.

7. The method of claim 5, wherein modeling the time series of data values with the model comprises modeling the time series of data values using a Poisson process model.

8. A method comprising:
receiving a time series of data values representing occurrences of events at plural time points, wherein receiving the time series of data values is at a first time granularity level;
computing, by a computer, durations between successive events;
detecting, by the computer, a burst of activity based on the computed durations;
determining, by the computer, that a change has occurred in response to detecting the burst of activity;
determining, by the computer, a second time granularity level to perform the computing, detecting, and determining; and
if the second time granularity level is coarser than the first time granularity level, aggregating the time series of data values to enable performance of the computing, detecting, and determining at the second time granularity level.

9. The method of claim 8, wherein determining the change has occurred uses an algorithm that is able to determine that momentary increased or decreased bursts of activity are not indicative of change.

10. The method of claim 8, wherein receiving the time series of data values representing occurrences of events at plural time points comprises receiving the time series of data values representing at least one of calls to a call center, visits to an online site, visits to a retail store, utilization of hardware resources, utilization of software resources, network traffic, and response time performance.

11. A method comprising:
based on occurrences of events over time, deriving, by a computer, a series of duration values that represent durations between successive events; and
applying, by the computer, a change point detection algorithm to the series of duration values to identify an estimated change point indicative of a time at which a change occurred, wherein applying the change point detection algorithm to the series of duration values to identify at least one estimated change point causes identification of a range of estimated change points.

12. The method of claim 11, wherein applying the change point detection algorithm comprises applying an algorithm selected from the group consisting of a cumulative sums detection algorithm, a generalized likelihood ratio algorithm, a regression detection algorithm, and an algorithm able to detect a change based on a burst of activity of the events.

13. The method of claim 11, wherein identification of the range of estimated change points is based on computing detection measurability values.

14. The method of claim 11, wherein the events occur continuously over time, the method further comprising discretizing to convert events occurring continuously over time to events occurring at discrete time points.

15. The method of claim 11, further comprising indicating that a change in a business environment has occurred in response to the identified change point.

16. A computer-readable storage medium storing instructions that when executed by a computer cause the computer to:
receive a time series of data values representing occurrences of events at plural time points;
compute inter-arrival durations between successive events;
store a time series of duration values representing the inter-arrival durations between successive events;
detect a burst of activity based on the time series of duration values; and
determine that a change has occurred in response to detecting the burst of activity.

17. The computer-readable storage medium of claim 16, which when executed cause the computer to further model the time series of data values with a model that has a first arrival process of events prior to a change point with a first mean arrival rate, and that has a second arrival process of events after the change point with a second mean arrival rate.

* * * * *

UNITED STATES PATENT AND TRADEMARK OFFICE
CERTIFICATE OF CORRECTION

PATENT NO. : 7,783,509 B1  Page 1 of 1
APPLICATION NO. : 11/373592
DATED : August 24, 2010
INVENTOR(S) : Jerry Z. Shan et al.

It is certified that error appears in the above-identified patent and that said Letters Patent is hereby corrected as shown below:

On the face page, in field (54), Title, in column 1, line 2, delete "OCCURED" and insert -- OCCURRED --, therefor.

In column 1, line 2, delete "OCCURED" and insert -- OCCURRED --, therefor.

Signed and Sealed this

Fourteenth Day of December, 2010

David J. Kappos
*Director of the United States Patent and Trademark Office*